Sept. 22, 1959     R. PROSKAUER     2,905,914
MAGNETIC-TYPE SIGNAL GENERATOR DEVICE
Filed July 30, 1954     2 Sheets-Sheet 1

INVENTOR
RICHARD PROSKAUER
BY
ATTORNEY

Sept. 22, 1959     R. PROSKAUER     2,905,914
MAGNETIC-TYPE SIGNAL GENERATOR DEVICE
Filed July 30, 1954     2 Sheets-Sheet 2

INVENTOR
RICHARD PROSKAUER
BY
ATTORNEY

United States Patent Office 2,905,914
Patented Sept. 22, 1959

2,905,914

MAGNETIC-TYPE SIGNAL GENERATOR DEVICE

Richard Proskauer, New Hyde Park, N.Y., assignor to Sperry Rand Corporation, a corporation of Delaware Application July 30, 1954, Serial No. 446,917

8 Claims. (Cl. 336—117)

The present invention relates to signal generator devices for providing electrical output data which is a predetermined function of mechanical input data supplied thereto.

It is an object of the present invention to provide a substantially coercion-free magnetic-type signal generator device wherein stray magnetic fields have substantially no influence upon the output voltage provided thereby.

It is a further object of the present invention to provide a signal generator or pick-off device for providing an output voltage whose magnitude is linearly related to constant increments of displacement between two relatively movable parts of the device.

It is yet another object of the present invention to provide a pick-off device wherein when two relatively movable parts thereof are symmetrically located with respect to each other the output voltage provided by the device is substantially zero.

It is still another object of the invention to provide a signal generator device for providing an output voltage which is a function of relative velocity or relative displacement and velocity between two parts thereof.

The foregoing and other objects and advantages of the present invention which will become apparent to those skilled in the art are attained by providing a signal generator device comprising two magnetically permeable structures having a plurality of symmetrically disposed arms so that the ends of corresponding arms thereof are closely adjacent opposite each other with an air gap therebetween. First winding means are supported by the permeable structures with the pole faces of the opposing arms of the two structures always being of opposite magnetic polarity. Second winding means comprising two substantially coplanar loop conductors connected in series-opposition are supported for relative motion in the air gap between the permeable structures in a direction transverse the axes of the arms thereof. By properly exciting the input winding means, the device may be adapted to provide an output voltage whose magnitude is a function of relative displacement, relative velocity, or relative displacement and velocity between the second winding means and the magnetically permeable structures along a line transverse the axes of the arms of said permeable structures.

Referring to the drawings.

Figure 1:
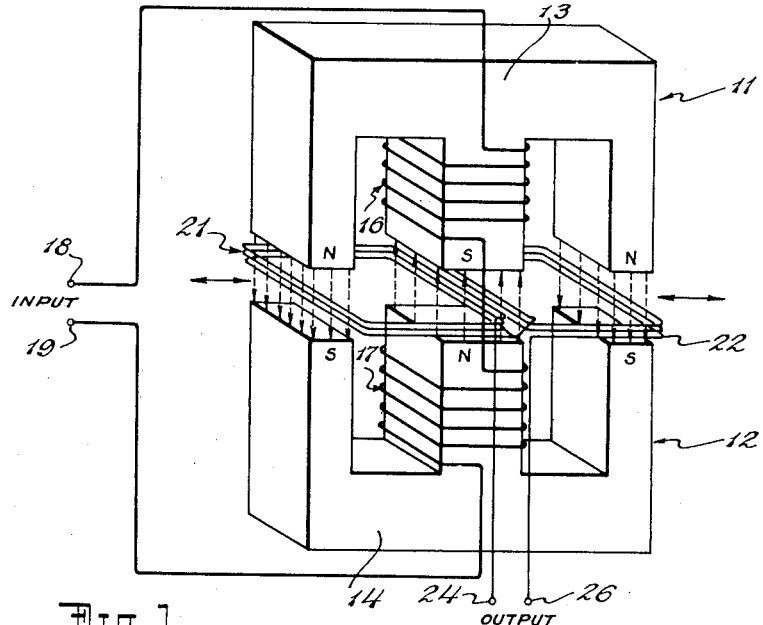
Fig. 1 is a perspective view in schematic form of a first signal generator device in accordance with the present invention.
Figure 2:
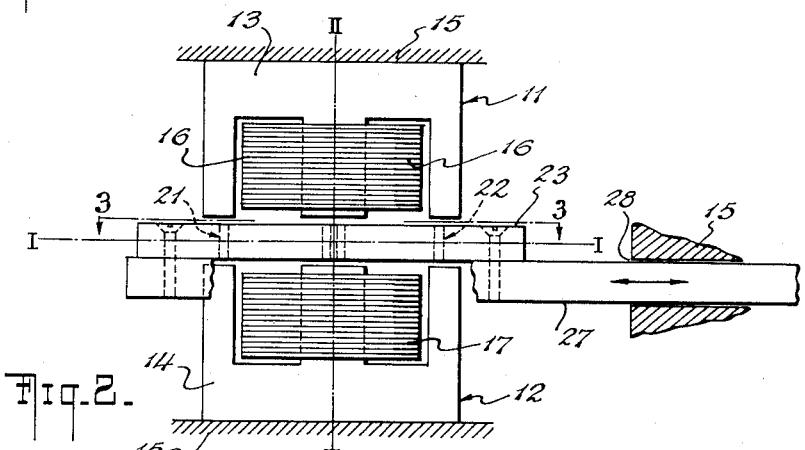
Fig. 2 is a side view of an actual embodiment of the device of Fig. 1.
Figure 3:
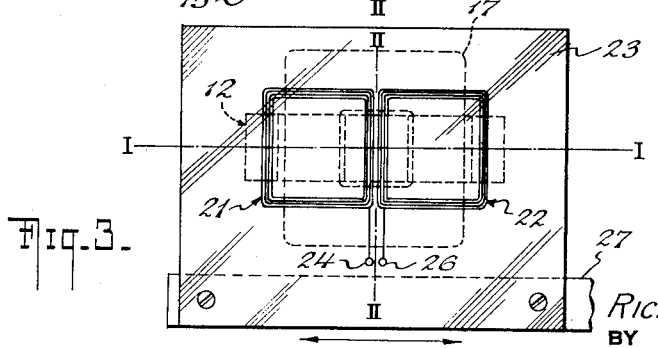
Fig. 3 is a plan view of the device shown in Fig. 2 taken along the line 3—3 in Fig. 2.

Referring to Figs. 1–3, the stator of a signal generator or pick-off device in accordance with a first embodiment of the present invention is comprised of a first E-shaped ferromagnetic core structure 11 and a second E-shaped ferromagnetic core structure 12. Cores 11 and 12 are preferably identical to each other, the two end arms of each core having the same dimensions. The center arm of each core is approximately twice as wide as the end arms thereof. It is preferable that each of cores 11 and 12 be composed of a plurality of E-shaped laminae or of magnetically permeable material of high electrical resistivity to minimize the effect of eddy currents.

Each of the arms of E-cores 11 and 12 are rectangular in cross-section with the end faces of the arms of core 11 being located in closely adjacent opposing relationship with the end faces of the corresponding arms of core 12. A uniform air gap is maintained between the opposing faces of the arms, the opposing center arms and the opposing end arms of cores 11 and 12 being coaxially aligned with each other. The cores 11 and 12 are symmetrical about the line I—I in Figs. 2 and 3.

Bases 13 and 14 of the cores 11 and 12, respectively, are fixed to any reference object with respect to which displacement or motion of another object is to be detected or indicated by the signal generator device. The reference object is schematically indicated at 15 in Fig. 2, for example.

First winding means comprising first and second serially-connected wire coils 16 and 17 are supported around the center arms of the E-cores 11 and 12, respectively. The coils 16 and 17 are preferably identical and connected in inductive-aiding relationship as is schematically indicated in Fig. 1. The two open ends of coils 16 and 17 are affixed to input terminals 18 and 19 for supplying the coils with an input voltage.

The armature of the device shown in Figs. 1–3 comprises a second winding means consisting of a first rectangularly wound wire loop 21 and a second rectangularly wound wire loop 22. Loops 21 and 22 are substantially identical, each loop being comprised of the same number of insulated turns wound to form a plurality of self-supported layers. The loops 21 and 22 of the device shown in Figs. 1–3 are similar to standard meter coils and are connected in series-opposing relationship with their winding directions opposite as is schematically indicated in Fig. 1.

The loops 21 and 22 are molded in a plastic block member 23 for protection and coplanar support thereof, the open ends of loops 21 and 22 being affixed to output terminals 24 and 26 embedded in one side of the member 23 as shown in Fig. 3. A rectangular bar element 27 is attached to block member 23 to hold it and loops 21 and 22 within the air gap between E-cores 11 and 12 so that the plane of the loops is substantially perpendicular to the axes of the arms of cores 11 and 12. The bar element 27 is conformal to a rectangularly shaped bearing 28 in the fixed object 15 for providing the required support, it being desirable for mechanical reasons that there be no engagement between the member 23 and the faces of the arms of core structures 11 and 12. It should be understood that the bar element 27 and bearing 28 are merely shown for illustrative purposes; any other suitable means for support of member 23 could be utilized in lieu of the means shown.

Element 27 is slidable back and forth in the bearing 28 thereby providing for movement of loops 21 and 22 along the line I—I in Figs. 2 and 3. When the loops 21 and 22 are symmetrically located about a symmetrical plane through the E-cores 11 and 12 along lines II—II in Figs. 2 and 3, each loop overlaps portions of the center pair of arms of cores 11 and 12 that are larger than the overlapped portions of either end pair of arms of cores 11 and 12. The adjacent parallel sides of loops 21 and 22 perpendicular to the line I—I are very close together as illustrated.

If an alternating-current input voltage is supplied to the terminals 18 and 19 of the device shown in Figs. 1–3, an alternating-current output voltage is provided at the terminals 24 and 26 whose magnitude is determined by the displacement of loops 21 and 22 from a symmetrical location with respect to the plane through lines II—II in Figs. 2 and 3. The phase of the output voltage for displacements of loops 21 and 22 from their symmetrical location about the plane through lines II—II is dependent on the direction of the displacement from the symmetrical location.

When the input terminals 18 and 19 are supplied with an alternating-current input voltage as aforedescribed, magnetic lines of force are produced across the air gap between the end faces of the arms of the magnetically permeable cores 11 and 12. The magnetic lines of force in the air gap portions are schematically indicated by the dashed lines in Fig. 1 between the opposing faces of the arms of cores 11 and 12.

When the exciting voltage is of one polarity, the opposing faces of the arms of cores 11 and 12 have north or south magnetic polarities as indicated by the letters N and S, respectively. When the polarity of the excitation voltage reverses, the polarities of all the pole faces are also reversed. The magnetic polarities of the opposing pole faces of structures 11 and 12 are, therefore, always opposite.

If the input terminals 18 and 19 are supplied with an alternating-current input voltage the changing magnetic lines of force between the left-hand pair of arms of E-cores 11 and 12 which link the loop 21 cause a voltage to be induced between the ends of loop 21 which is opposite in phase to the voltage induced between the ends of loop 21 by the changing magnetic lines of force between the center pair of arms of cores 11 and 12 which link loop 21. Thus, the magnitude and phase of the individual net voltage induced between the ends of loop 21 is dependent on the location of the loop 21 with respect to the left-hand pair of end arms and the center pair of end arms of cores 11 and 12. A corresponding situation obtains with respect to the individual net voltage induced between the ends of the loop 22 as a result of the changing magnetic lines of force between the right-hand pair of end arms and the center pair of end arms of cores 11 and 12.

When the loops 21 and 22 are symmetrically located about the axis of the center arms of E-cores 11 and 12, as is shown more clearly in Figs. 2 and 3, more lines of magnetic force between the center pair of arms link the loops than the lines of magnetic force between the end pairs of arms. However, the output voltage at the terminals 24 and 26 of the device is substantially zero. This occurs since the loops 21 and 22 are connected in series opposition and the individual net voltages induced in each loop are equal and oppose each other.

Figure 4:
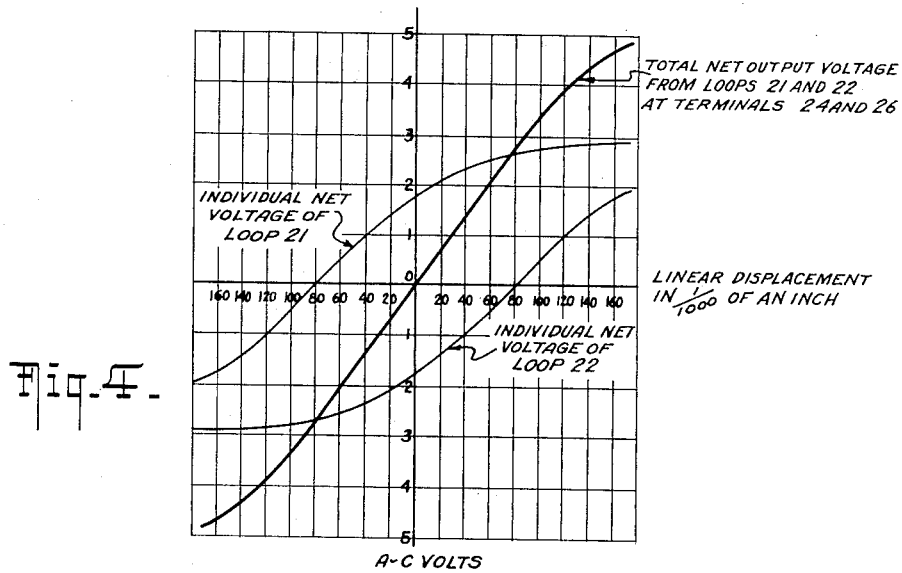
Fig. 4 is a graph of the magnitudes of individual armature loop voltages and the total net output voltage of the armature loops versus displacement of the loops for the device shown in Figs. 1–3 when excited by an alternating-current input voltage.

To illustrate the above, reference should be made to Fig. 4. For one particular device constructed as shown in Figs. 1–3 with the input terminals 18 and 19 supplied with an alternating-current input voltage or 115 volts at 400 cycles per second, for example, Fig. 4 shows the magnitudes of the individual net voltages between the two ends of each of loops 21 and 22, respectively, and the magnitude of the total net output voltage at the terminals 24 and 26 as a function of displacement of the loops along the line I—I in Fig. 2. The ordinate in Fig. 4 corresponds to a position wherein the loops 21 and 22 are symmetrically located about a plane through the lines II—II in Figs. 2 and 3. If the displacement of loops 21 and 22 from their symmetrical location shown in Figs. 2 and 3 is zero, equal opposing voltages are induced in each of loops 21 and 22. Therefore, the total net output voltage at terminals 24 and 26 is zero, as is indicated at the ordinate in Fig. 4.

When the loops 21 and 22 are simultaneously displaced to the right along the line I—I from their symmetrical location by adjustment of bar 27, the individual net voltage induced in loop 21 increases and the individual net voltage induced in loop 22 decreases, as is indicated by the portions of the curves to the right of the ordinate in Fig. 4. Beyond the point where the individual net voltage induced in loop 22 is at a null, the individual net voltage induced in loop 22 reverses its phase to add directly with the individual net voltage induced in loop 21.

When the loops 21 and 22 are simultaneously displaced to the left along the line I—I from their symmetrical location in Figs. 2 and 3, the individual net voltage induced in loop 22 increases and the individual net voltage induced in loop 21 decreases, as is indicated by the portions of the curves to the left of the ordinate in Fig. 4. Beyond the point where the individual net voltage induced in loop 21 is at a null, the individual net voltage induced in loop 21 reverses its phase to add directly with the individual net voltage induced in loop 22.

As is indicated by Fig. 4, the sum or total net voltage at the output terminals 24 and 26 is linearly variable over a wider range of displacement of the armature loops 21 and 22 from their symmetrical location than are either of the individual loop voltages. The voltage at the output terminals 24 and 26 is of one phase when the displacement of the loops is to the right of a plane through lines II—II in Figs. 2 and 3 and of the opposite phase when the displacement is to the left of lines II—II in Figs. 2 and 3. It can be seen from the graph in Fig. 4 that the signal generator device is extremely sensitive, very small displacements of the armature loops 21 and 22 causing significant variations in the voltage at output terminals 24 and 26.

Connecting the two identical armature loops 21 and 22 in series opposition as has been described is effective in substantially reducing or eliminating irregularities in the output voltage of the signal generator device which may occur because of the induction of voltages in the respective loops 21 and 22 by stray magnetic fields. Such induced voltages oppose each other so that the net effect of their components caused by homogeneous stray fields is zero. Furthermore, the use of the symmetrical pair of E-cores 11 and 12 tends to concentrate the magnetic field due to coils 16 and 17 across the air gap between the faces of the carms of cores 11 and 12 so that voltages thereby induced in the respective loops 21 and 22 will be enhanced relative to those induced by stray fields.

Magnetic coercion of the armature loop means of the signal generator devices disclosed herein is substantially reduced and effectively nil for most applications, especially if a high resistant output load is connected between terminals 24 and 26 to minimize current flow between these terminals. Minute magnetic coercion which is produced when a low resistance output load is employed and current flows between terminals 24 and 26 always tends to maintain the loops 21 and 22 symmetrical about a plane through the lines II—II in Figs. 2 and 3.

When the loops 21 and 22 are symmetrically located as aforedescribed the net current flow in each loop due to the voltages induced therein by the linking lines of magnetic force between the arms of E-cores 11 and 12 causes the upper and lower sides of each loop to have the same magnetic polarities as the upper and lower arms of cores 11 and 12, respectively. Therefore, the loops 21 and 22 are subjected to magnetic repelling forces of equal intensity to the left and to the right.

As the loops 21 and 22 are moved along the line I—I from their symmetrical location the repelling force between the particular loop moving closer to the center arms of the E-cores 11 and 12 increases while the repelling force between the other loop and the center arms of the E-cores decreases. Therefore, the extremely small net coercive force acting upon the loops would tend to drive the loops back to their symmetrical location.

Figure 5:
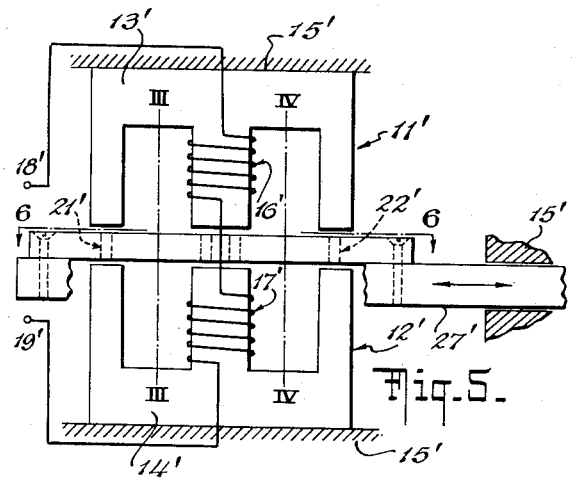
Fig. 5 is a side view of a further embodiment of the present invention.
Figure 6:
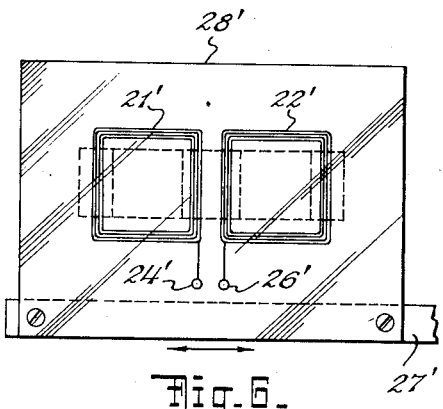
Fig. 6 is a plan view of the device shown in Fig. 5 taken along the line 6—6 in Fig. 5.

A signal generator device in accordance with a further embodiment of the present invention is illustrated in Fig. 5 and Fig. 6. This device is similar to the device shown in Figs. 1–3, primed reference numerals being used in Figs. 5 and 6 on parts of the device which are similar to corresponding parts of the device shown in Figs. 1–3. The essential difference between the two embodiments of the invention lies in the relative position of the two loops of the armature with respect to each other and with respect to the E-core stators of the device.

In Figs. 5 and 6, when the armature loops 21' and 22' are symmetrically disposed relative to a common axis through the center pair of arms of E-cores 11' and 12', the axis of the armature loop 21' lies within a plane perpendicular to the drawings through line III—III bisecting the space between the center pair and the left-hand end pair of arms of E-cores 11' and 12'. At the same time the axis of the armature loop 22' lies within a plane perpendicular to the drawings through line IV—IV bisecting the space between the center pair and the right-hand end pair of arms of E-cores 11' and 12'. Functionally, each of loops 21' and 22' is located so that when the armature of the device is symmetrically located with respect to its stator, and an alternating-current input voltage is supplied to terminals 18' and 19', the individual net voltage induced in each armature loop by the changing magnetic lines of force between the ends of the arms of cores 11 and 12 is zero.

The voltage at the output terminals 24' and 26' when the loops 21' and 22' are symmetrically located is comprised of the subtraction of two alternating voltages which are essentially zero instead of two relatively large voltages as in the device of Figs. 1–3. This insures that an optimum output voltage null is provided at terminals 24' and 26' when the loops 21' and 22' are symmetrically located, even if there is a slight difference in phase between the individual induced loop voltages as a result of inhomogeneities in the respective pairs of end arms of the E-cores 11' and 12'.

Figure 7:
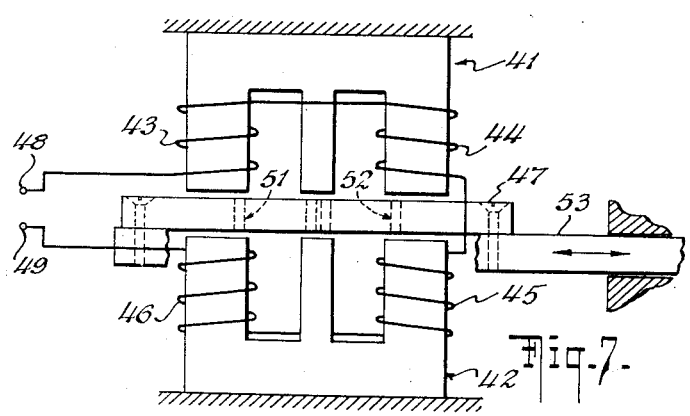
Fig. 7 is a side view of a signal generator device in accordance with another embodiment of the present invention.

A further embodiment of the present invention is illustrated in Fig. 7. In this embodiment the stator of the device comprises an E-shaped magnetic core structure 41 and an E-shaped magnetic core 42. The E-cores 41 and 42 are symmetrically disposed relative to each other in the same manner as has been described with respect to Figs. 1–3. The arms of cores 41 and 42 are rectangular in cross-section, the center pair of arms being narrower than the end pairs of arms as illustrated.

The four end arms of E-cores 41 and 42 support four wire coils 43, 44, 45 and 46, respectively, as is schematically shown in Fig. 7. The coils 43—46 are all connected in series-aiding relationship between input terminals 48 and 49.

First and second coplanar loop conductors 51 and 52 are positioned in the air gap between E-cores 41 and 42. The loops 51 and 52 are rectangular and similar to standard meter coils as has been described before, and are connected in series-opposing relationship. The loops 51 and 52 are also molded in a plastic block 47 for protection and support, and are movably located within the air gap between cores 41 and 42 by a bar element 53 affixed to block 47. Output terminals (not shown) are embedded on a face of the block 47 for connection to the open ends of loops 51 and 52 in the same manner as described with respect to terminals 24 and 26 in Figs. 2 and 3.

When the loops 51 and 52 are symmetrically disposed relative to the axis of the center pair of arms of the E-cores 41 and 42, the axis of loop 51 is coincident with a plane perpendicular to the drawing which bisects the space between the center pair and the left-hand end pair of arms of E-cores 41 and 42. At such a time the axis of loop 52 is coincident with a plane perpendicular to the drawing which bisects the space between the center pair and the right-hand end pair of arms of E-cores 41 and 42. Since the center pair of arms of the cores are very narrow the loops 51 and 52 can be located in very close relationship so as to be practically contiguous. This insures the likelihood that even inhomogeneous stray magnetic force will induce equal voltages in the loops 51 and 52 for cancellation thereof due to their series-opposing connection.

When the armature loops 51 and 52 are symmetrically located as shown in Fig. 7 and an alternating-current input voltage is supplied to the terminals 48 and 49, the net voltage induced in each loop by the magnetic fields of the winding means comprising coils 43, 44, 45 and 46 is substantially zero as each loop is in a null position. Movement to the right or to the left of the illustrated location causes a total net output voltage to be provided between the open ends of loops 51 and 52 whose magnitude varies linearly in accordance with the extent of displacement of the loops and whose phase is dependent on whether the loops 51 and 52 are displaced to one side or the other of their symmetrical location.

Although the aforedescribed signal generator devices have been illustrated as being adapted to provide an output voltage which is a function of relative linear displacement between two relatively movable objects, it is obvious that the device also may be utilized to indicate displacements along an arc. Furthermore, the signal generator devices illustrated in Figs. 1–7 may be utilized for providing a direct-current output voltage whose magnitude is related to the relative motion or velocity between the armature loops and E-core stator means during relative motion therebetween.

If the devices in Fig. 1 were utilized to provide a signal voltage which is a function of relative velocity between two elements, for example, a direct-current input voltage would be supplied to the winding means comprising coils 16 and 17. The cores 11 and 12 and coils 16 and 17 would then comprise an electromagnet wherein the magnetic polarities of the opposing pole faces of the arms of the cores due to the direct-current energization of the coils would always be opposite and unchangeable. Motion of the armature loop conductors 21 and 22 when in the vicinity of the center arms of the E-cores 11 and 12 would then provide a substantially constant direct-current output voltage over the range of displacement corresponding to the range at which the output voltage in Fig. 4 is a linear function of displacement. The magnitude of the output voltage would be directly related to the relative velocity between the armature loops and the E-cores. The polarity of the output voltage would be a function of whether the motion of the armature loops was to the right or to the left. It would even be feasible to simultaneously supply the input terminals of such a device with both alternating and direct-current voltages for providing an output which is indicative of both displacement and relative motion.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A signal generator device, comprising first and second similar E-shaped cores of magnetic material, with three arms of one core respectively facing the three arms of the other core, the opposing faces of the arms of said cores being spaced from each other, winding means disposed about said cores for magnetization thereof, first and second serially connected loop conductors having a similar number of turns of similar configuration, said loop conductors being in side by side relationship and disposed between said cores for linkage with lines of magnetic force provided between the opposing faces of said core arms, and means supporting said loop conductors for transverse relative displacement with respect to said cores along a line passing through the axes of said cores, said loop conductors having a pair of adjacent sides which lie between the opposing faces of an intermediate pair of core arms and a further pair of sides which lie substantially between the opposing faces of one and another pair of core arms for at least one relative position between said loop conductors and said cores.

2. A signal generator device, comprising first and second similar E-shaped cores of magnetic material, the three parallel arms of one core being aligned with the three parallel arms of the other core, the three parallel arms of each core terminating in coplanar faces at right angles with the axes of said arms, the faces of the arms of said cores having areas of rectangular configuration with the areas of the faces of the end arms of said cores being equal to each other, winding means disposed about said cores for magnetization thereof for providing lines of magnetic force between the opposing faces of said core arms, first and second loop conductors having a similar number of turns of rectangular configuration, said loop conductors being in side by side coplanar relationship between said cores for linkage with lines of magnetic force provided between the opposing faces of said core arms, means connecting said loop conductors in series-opposing relationship, and means supporting said loop conductors for transverse relative displacement with respect to said cores along a line passing through the axes of said core arms, said loop conductors having a pair of adjacent sides at right angles with said line, said adjacent sides lying between the opposing faces of an intermediate pair of core arms, said loop conductors having a further pair of sides which respectively lie between the opposing faces of one and the other pair of said core arms for at least one relative position between said loop conductors and said cores.

3. In a signal generator device an E-shaped structure of magnetic material, first and second serially connected windings lying opposite the end faces of the three parallel arms of said E-shaped structure, each winding bounding an area that overlaps a projection of the end face of the center arm and a projection of the end face of an end arm of the three parallel arms of said E-shaped structure for at least one relative position between said windings and said structure, and means for supporting said E-shaped structure and said windings for relative transverse displacement with respect to each other for varying the overlap between the area bound by each winding and the projection of the end face of said center arm relative to the overlap between the area bound by each winding and the projection of the end face of an end arm of said E-shaped structure.

4. The combination set forth in claim 3 wherein the cross sectional area of the center arm of said E-shaped structure is approximately twice as large as the cross sectional area of either of the end arms of said structure, the extent by which the area bound by each winding overlaps the projection of the end face of said center arm being larger than the extent by which the area bound by each winding overlaps the projection of the end face of an end arm of said E-shaped structure for a symmetrical position of said windings relative to the axis of the center arm of said E-shaped structure.

5. The combination set forth in claim 3 wherein the cross sectional area of the center arm of said E-shaped structure is approximately twice as large as the cross sectional area of either of the end arms of said structure, the extent by which the area bound by each winding overlaps the projection of the end face of said center arm being substantially equal to the extent by which the area bound by each winding overlaps the projection of an end face of an end arm of said E-shaped structure for a symmetrical position of said windings relative to the axis of the center arm of said E-shaped structure.

6. A signal generator device as set forth in claim 1 wherein the cross sectional area of the intermediate arms of said cores is approximately twice as large as the cross sectional area of the end arms of said cores, each loop conductor bounding an area that extends into the space between the opposing faces of the pair of intermediate arms and the space between the opposing faces of a pair of end arms of said cores, the extent into the space between the opposing faces of the pair of intermediate arms being larger than the extent into the space between the opposing faces of a pair of end arms for a symmetrical position of said loop conductors relative to the axes of the intermediate pair of core arms.

7. A signal generator device as set forth in claim 1 wherein the cross sectional area of the intermediate arms of said cores is approximately twice as large as the cross sectional area of the end arms of said cores, each loop conductor bounding an area that extends into the space between the opposing faces of the pair of intermediate arms and the space between the opposing faces of a pair of end arms of said cores, the extent into the space between the opposing faces of the pair of intermediate arms being substantially equal to the extent into the space between the opposing faces of a pair of end arms for a symmetrical position of said loop conductors relative to the axes of the intermediate pair of core arms.

8. A signal generator device as set forth in claim 1 wherein the adjacent sides of said loop conductors are very close to each other, the spaces between said arms of said E-shaped cores being substantially coextensive with the spaces between the adjacent and opposite sides of said loop conductors for a symmetrical position of said loop conductors relative to the axes of the intermediate pair of core arms.

References Cited in the file of this patent

UNITED STATES PATENTS 2,269,453  Gayhart  Jan. 13, 1942